Nov. 10, 1959  W. CARL  2,911,872
VIOLIN BREAKING-IN APPARATUS
Filed Sept. 17, 1957  2 Sheets-Sheet 1
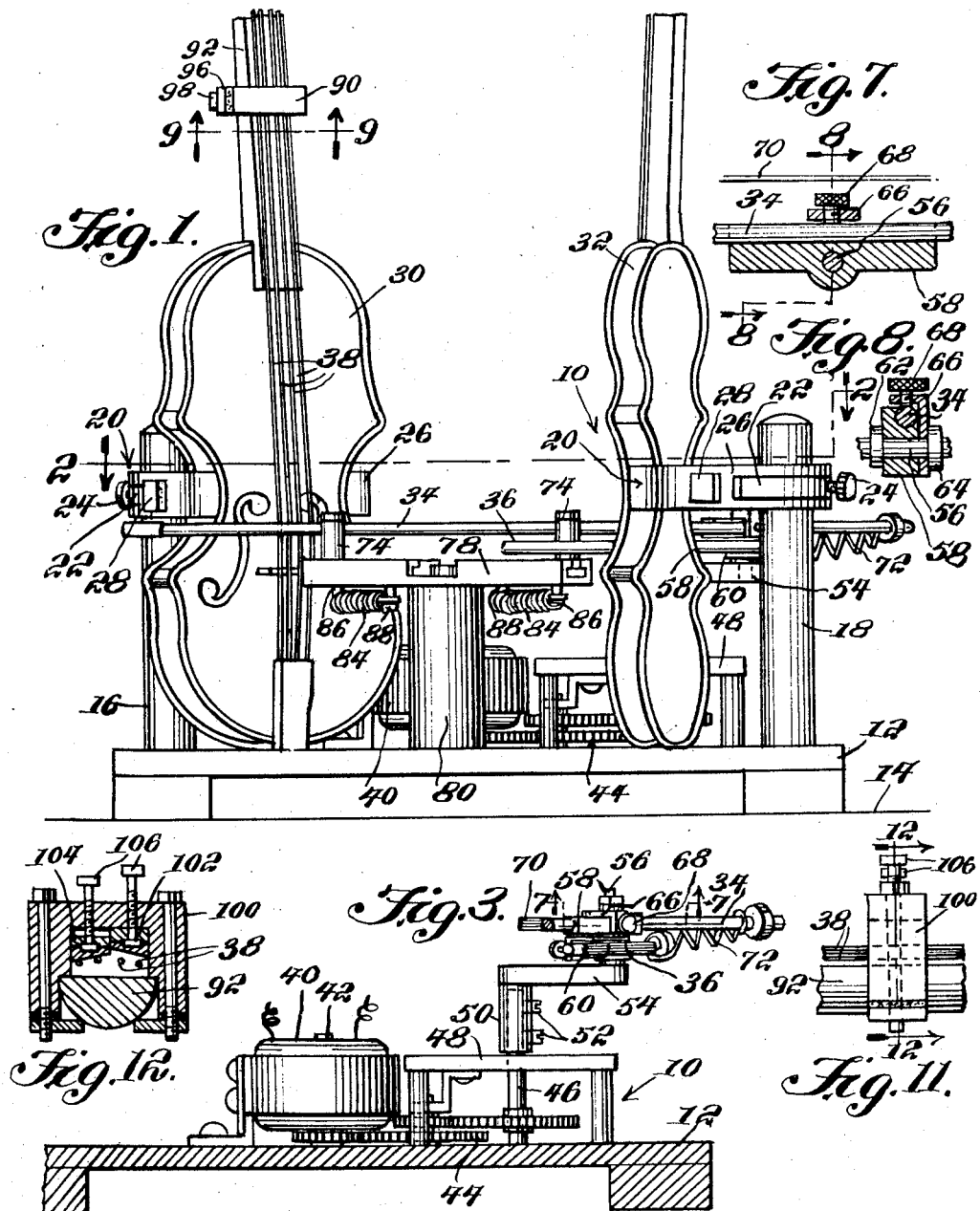
INVENTOR.
Wendel Carl,
BY
McMorrow, Berman & Davidson
ATTORNEYS Nov. 10, 1959 W. CARL 2,911,872
VIOLIN BREAKING-IN APPARATUS
Filed Sept. 17, 1957 2 Sheets-Sheet 2
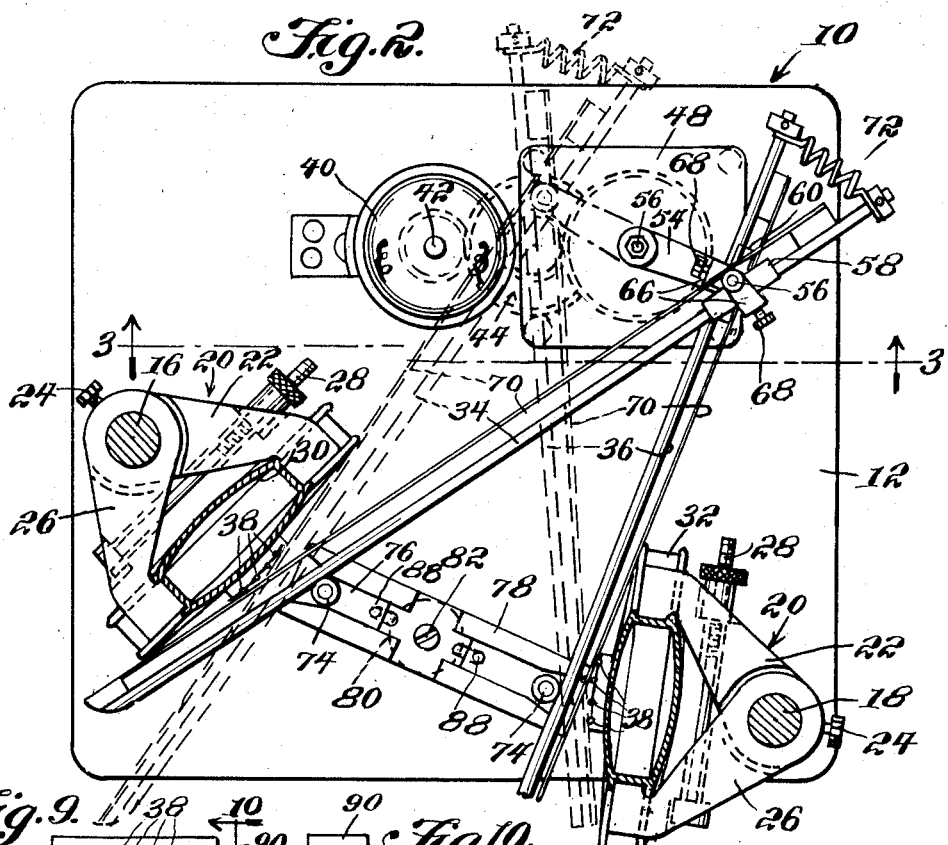//
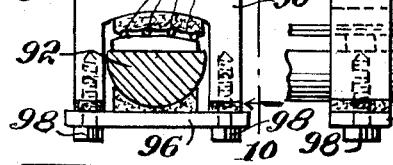
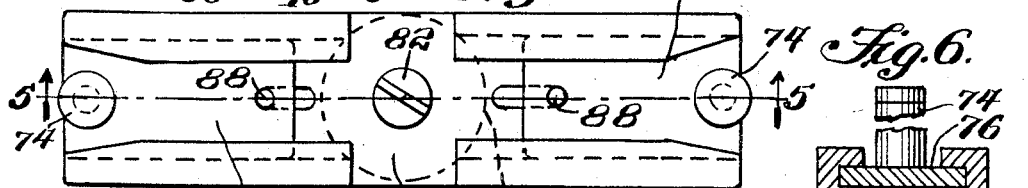
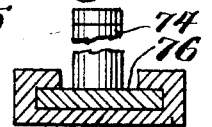
INVENTOR.
Wendel Carl,
BY
McMorrow, Berman + Davidson
ATTORNEYS

United States Patent Office 2,911,872
Patented Nov. 10, 1959

2,911,872

VIOLIN BREAKING-IN APPARATUS

Wendel Carl, Cleveland, Ohio

Application September 17, 1957, Serial No. 684,486

2 Claims. (Cl. 84—173)

The present invention relates to violins generally and specifically to an apparatus for breaking in a violin.

It is a matter of common belief that newly manufactured violins require a period of breaking in or playing before they have good tonal qualities.

Owners of violins created by famous-named craftsmen are known to lend their violins to violinists in order that the violins have their tonal quality renewed by playing.

An object of the present invention is to provide an apparatus which enables the user to mechanically play a violin for a period of time sufficient to fully and completely break in the violin and enable a player thereof to obtain optimum tonal response from the violin.

Another object of the present invention is to provide an apparatus which enables a user to mechanically play at least two violins at the same time, playing all the strings of each violin in succession, play any selected position upon any one of said strings, and in a manner of hours effect the playing of the violin or violins equivalent to many months and weeks of actual playing.

These and other objects and advantages of the present invention will be fully apparent from the following description when taken in connection with the annexed drawings, in which:

Figure 1 is an elevational view of the apparatus according to the present invention showing two violins supported thereon, the upper ends of the violins being broken away;

Figure 2 is a view in section taken on line 2—2 of Figure 1, one position of each of the bows being shown in full lines and a second position of each of the bows being shown in dotted lines;

Figure 3 is an elevational view, partially in section, taken on the line 3—3 of Figure 2;

Figure 4 is a plan view of a means for biasing the bows toward the violins, on a scale wider than that of Figures 1 to 3, inclusive;

Figure 5 is a sectional view taken on the line 5—5 of Figure 4;

Figure 6 is a sectional view taken on the line 6—6 of Figure 5;

Figure 7 is a sectional view on an enlarged scale, taken on line 7—7 of Figure 3;

Figure 8 is a sectional view taken on the line 8—8 of Figure 7;

Figure 9 is a sectional view taken on the line 9—9 of Figure 1;

Figure 10 is a view taken on the line 10—10 of Figure 9;

Figure 11 is a view similar to Figure 10, showing a modified form of the assembly of Figures 9 and 10; and Figure 12 is a sectional view taken on the line 12—12 of Figure 11.

Referring in greater detail to the drawings in which like numerals indicate like parts throughout the several views, the violin breaking-in apparatus according to the present invention is designated generally in Figures 1 to 3 by the reference numeral 10 and comprises a base 12 adapted to rest upon a supporting surface, such as that indicated by the reference numeral 14 in Figure 1.

A pair of posts 16 and 18 rise from the base 12 in spaced relation and serve as supports for identical clamping members 20 which are detachably and slidably positioned on the posts 16 and 18. Each clamp member consists in a first arm 22 provided with a hole in one end thereof receiving the posts 16 or 18 and adjustably secured to such posts by means of a locking bolt 24. The clamp member 20 also includes a second arm 26 having a hole in one end for receiving the posts 16 or 18 and slotted through that one end for receiving the adjacent portion of the first arm 22. An adjustable clamping bolt 28 extends between the first and second arm of each of the clamping members 20 intermediate the ends of such arms and serves to adjustably position the free ends of the arms of the member 20 about the waist portion of a violin, two of which are shown in Figures 1 and 2 and designated by the reference numerals 30 and 32. The posts 16 and 18 and the respective clamping members 20 constitute means carried by the base 12 detachably securing the bodies of the violins 30 and 32 through the base 12 for holding such violins 30 and 32 in positions in which the front faces of their bodes extend in upright directions.

A pair of horizontally disposed bows 34 and 36 are positioned with respect to the violins 30 and 32 so that the hair of each of the bows 34 and 36 is in contact with the stretched strings 38 which are mounted and stretched in spaced relation over the front face of each of the violin bodies.

Automatic means is provided by the present invention operatively connected to each of the bows 34 and 36 to impart to the bows 34 and 36 back and forth movement transversely of and in an arcuate path across and about the stretched strings 38 of each of the violins 30 and 32. Specifically, this means consists in a motor 40, having a drive shaft 42 which is vertically disposed and carried by the base 12. A plurality of spur gears in mesh with each other constitute a gear train 44 operatively connecting the drive shaft 42 to a vertically disposed driven shaft 46 which has its lower end journaled in the base 12 and has its upper end extending through and projecting above a support member 48. A sleeve 50 is detachably secured to the upper end portion of the driven shaft 46 by means of set screws 52 and has its upper end fixedly secured to one end of an arm 54 which carries a vertically disposed crank pin 56 on its other end. A pair of horizontally disposed blocks 58 and 60 are freely rotatable upon the pin 56. The blocks 58 and 60 are identical and are shown in detail in Figures 7 and 8 and each is formed with a ledge along one side receiving the portion of the respective one of the bows 34 and 36 inwardly of one end of the latter. The pin 56 is provided with collars 62 and 64 separating the blocks 58 and 60 from each other and forming a support for the latter. An L-shaped clamp 66 with an associated thumb screw 68 extends over the portion of the bow 34 or 36 and holds the latter in longtiudinal alignment with the block 58 or 60. In Figure 7, the reference numeral 70 designates the hair portion of the bow 34.

Means is provided by the present invention operatively connected to each of the bows 34 and 36 for urging the bows 34 and 36 into contact with the stretched strings 38 of the associated violins 30 and 32 during the back and forth movement of the bows 34 and 36 transversely of and in an arcuate path across and about the stretched strings 38. One part of such means consists in a compression spring 72 extending between and having its ends fixed to the ends of the bows 34 and 36 remote from the violins 30 and 32, as shown most clearly in Figure 2.

The other part of the means for urging the bows 34 and 36 into contact with the stretched strings 38 of the associated violins 30 and 32 consists in a pair of rollers 74 (Figs. 5 and 6) carried on the ends of a pair of slide members 76 slidably mounted upon a horizontally disposed bar 78. The bar is supported at its mid-portion upon the upper end of a post 80 by means of a screw 82, the post 80 being positioned substantially midway between the posts 16 and 18, as shown at Figure 2.

A spring 84 has one end connected to a bolt 86 dependingly carried on the underside of the bar 78 inwardly of each end of the latter and has its other end secured to a bolt 88 which extends through a slot in the bar 78 and is anchored in the adjacent slide member 76. The springs 84 serve to bias the rollers 74 outwardly from the post 80 and into rolling engagement with the bows 34 and 36.

Means is provided on the finger board of each of the violins 30 and 32 for releasably holding one or more of the strings 38 in such a manner as to sound such string or strings at a tone other than that sounded by such string or strings when open or vibrated through their full lengths. Specifically, this means consists in, in a first embodiment shown in Figures 9 and 10, a bridge member 90 encompassing the finger board 92 of the violin 30 (Fig. 1) and having a felt member 94 in engagement with the strings 38. A bar 96 connects the ends of the legs of the bridge member 90 together and secures the bridge member 90 upon the finger board 92, there being suitable cap screws as at 98 extending through the bar 96 into the bridge member 90. In Figures 11 and 12 is shown a modified form of a bridge member 100 for securement to a finger board 92 of a violin. In this form, Figure 12, blocks 102 and 104 are slidably mounted within the bridge member 100 for selective engagement with certain ones of the strings 38. The blocks 102 and 104 are carried on bolt members 106 for movement toward and away from the strings 38.

In use, the violins 30 and 32 are positioned in the upright direction adjacent the posts 16 and 18 and are clamped between the arms of the associated clamping member 20. The bows 34 and 36 are urged by the rollers 74 and by the spring 72 so that the hair of the bows 34 and 36 contacts one or more of the strings 38 of the associated violin. Upon energization of the motor 40, the drive shaft 42 rotates and imparts rotary movement through the gear train 44 to the arm 54 carrying the crank pin 56. The rotary movement of the arm 54 causes the bows 34 and 36 to reciprocate backwardly and forwardly transversely of the strings 38 and in an arcuate path across and about the strings 38. It will be seen in Figure 2 that as the bows 34 and 36 move from the full line position through the dotted line positions, the hair of the bows 34 and 36 engage each of the strings 38 in succession on each of the violins 30 and 32, thereby sounding or causing such strings to vibrate and sound the note to which they are tuned.

The present invention provides automatic playing of the violins over and over again on any of their selected tones and such repeated sounding of the strings of the violin effects the breaking-in of the violin in less time than would be required were the violins broken manually.

While only a single embodiment of the present invention is shown and described, other embodiments are contemplated and numerous changes and modifications may be made therein without departing from the spirit of the invention as set forth in the appended claims.

What is claimed is:

1. In a violin breaking-in apparatus, a base adapted to rest upon a supporting surface, a post rising from said base, a violin including a body having a front face and a plurality of strings mounted in stretched spaced relation over the front face positioned upon said base so that the violin is in an upright direction when adjacent said post with the front face facing away from said post, clamping means slidably carried by said post and detachably secured to said violin body for fixedly holding said violin in the uprirght direction, a vertically disposed driven shaft spaced from said post and carried by said base, a horizontally disposed bow positioned so that the hair of the bow is in contact with said stretched strings, means connecting said shaft to said bow so as to impart to said bow back-and-forth movement transversely of and in an arcuate path across and about said stretched strings, and means operatively connected to said bow for urging said bow into contact with said stretched strings during the back-and-forth movement of said bow transversely of and in an arcuate path across and about the stretched strings, said first-mentioned means including an arm having one end fixedly attached to the upper end of said shaft, a vertically disposed crank pin on the other end of said arm, and a block provided with a ledge freely rotatable about said pin, the portion of said bow remote from said violin being fixedly supported on said ledge.

2. In a violin breaking-in apparatus, a base adapted to rest upon a supporting surface, a pair of spaced posts rising from said base, a pair of violins each including a body having a front face and a plurality of strings mounted in stretched spaced relation over the front face positioned upon said base so that the violins are in upright directions and adjacent said posts with the front faces facing each other, clamping means slidably carried by each of said posts and detachably secured to the body of the adjacent violin for holding the violins in the upright directions, a vertically disposed driven shaft spaced from said posts and carried by said base, a pair of horizontally disposed bows positioned so that the hairs of the bows are in contact with the stretched strings of said violins, means connecting said shaft to said bows so as to impart to said bows simultaneous back-and-fourth movement transversely of and in an arcuate path across and about the stretched strings of said violins, and means operatively connected to said bows for urging said bows simultaneously into contact with the stretched strings of said violins during the back-and-forth movements of said bows transversely of and in an arcuate path across the stretched strings of said violins, said first-mentioned means including an arm having one end fixedly attached to the upper end of said shaft, a vertically disposed crank pin on the other end of said arm, and a pair of blocks each provided with a ledge freely rotatable about said pin, the portions of said bows remote from said violins being fixedly supported on said ledges, and said second mentioned means including a horizontally disposed bar carried by said base and adjacent said bows and a pair of upstanding spring biased rollers slidably mounted upon said bar and bearing against the portions of said bows adjacent the stretched strings of said violins, and a common spring means operatively connected to the ends of said bows remote from said violins.

References Cited in the file of this patent

UNITED STATES PATENTS

| 579,605 | Pierce | Mar. 30, 1897 |
| 991,596 | Bajde | May 9, 1911 |
| 1,131,930 | Henning | Mar. 16, 1915 |
| 1,467,576 | Flydal | Sept. 11, 1923 |
| 1,577,501 | Strawn | Mar. 23, 1926 |